US011217410B2

(12) United States Patent
Aoyama et al.

(10) Patent No.: US 11,217,410 B2
(45) Date of Patent: Jan. 4, 2022

(54) RELAY DRIVER CIRCUIT

(71) Applicants: Sumitomo Wiring Systems, Ltd., Yokkaichi (JP); Toyota Jidosha Kabushiki Kaisha, Toyota (JP)

(72) Inventors: Shinji Aoyama, Yokkaichi (JP); Hiroshi Kimoto, Yokkaichi (JP); Shinji Oshita, Toyota (JP); Nobutoshi Hagiwara, Miyoshi (JP); Kenichi Takayoshi, Nisshin (JP); Hiroki Onoyama, Nishio (JP); Takumi Matsumoto, Nagakute (JP)

(73) Assignees: SUMITOMO WIRING SYSTEMS, LTD., Yokkaichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/981,378

(22) PCT Filed: Mar. 8, 2019

(86) PCT No.: PCT/JP2019/009236
§ 371 (c)(1),
(2) Date: Sep. 16, 2020

(87) PCT Pub. No.: WO2019/181547
PCT Pub. Date: Sep. 26, 2019

(65) Prior Publication Data
US 2021/0050167 A1    Feb. 18, 2021

(30) Foreign Application Priority Data

Mar. 22, 2018 (JP) .............................. JP2018-054225

(51) Int. Cl.
H01H 47/32    (2006.01)
H01H 47/00    (2006.01)
H02H 9/00     (2006.01)

(52) U.S. Cl.
CPC ............... *H01H 47/32* (2013.01); *H02H 9/00* (2013.01)

(58) Field of Classification Search
CPC . H01H 47/32; H01H 47/002–005; H02H 9/00
See application file for complete search history.

(56) References Cited

U.S. PATENT DOCUMENTS 3,590,385 A * 6/1971 Sabo ........................ H03H 7/40
                                                      455/123
3,648,145 A * 3/1972 Meyer ..................... H02H 7/18
                                                      320/136

(Continued)

FOREIGN PATENT DOCUMENTS

JP    S52-140751 U    10/1977
JP    H8-103001 A     4/1996

(Continued)

OTHER PUBLICATIONS

International Search Report, Application No. PCT/JP2019/009236, dated May 28, 2019. ISA/Japan Patent Office.

*Primary Examiner* — Sisay G Tiku
(74) *Attorney, Agent, or Firm* — Honigman LLP

(57) ABSTRACT

A relay driver circuit is connected between an upper stage relay and a lower stage relay and is configured to be driven in response to driving of the upper relay. The relay driver circuit drives the lower stage relay. The relay driver circuit includes a semiconductor component, a control input line, a protective component, and a buffer circuit. The semiconductor component switches on and off the lower relay. The control input line is electrically connected to a control terminal of the semiconductor component. A power supply (Continued)

voltage is applied to the control input line via the upper stage relay. The protective component is connected in the control input line to protect the semiconductor component. The buffer circuit is connected between the protective component in the control input line and the control terminal of the semiconductor component to compensate for a voltage drop due to the protective component.

5 Claims, 3 Drawing Sheets

(56) References Cited

U.S. PATENT DOCUMENTS

| | | | | |
|---|---|---|---|---|
| 3,809,963 | A * | 5/1974 | Hutchinson | H02H 3/202 361/75 |
| 3,860,855 | A * | 1/1975 | Caswell | H02H 3/28 361/86 |
| 4,847,515 | A * | 7/1989 | Nakach | H03F 3/3437 327/484 |
| 4,945,358 | A * | 7/1990 | Wrzesinski | H02H 3/087 361/100 |
| 4,947,283 | A * | 8/1990 | Kono | H01F 7/1805 323/351 |
| 5,047,662 | A * | 9/1991 | Edwards | H03K 17/0826 327/110 |
| 5,578,950 | A * | 11/1996 | Kolanko | H03K 17/18 327/110 |
| 6,150,854 | A * | 11/2000 | Rosahl | H03K 17/08142 327/110 |
| 6,392,473 | B1 * | 5/2002 | Hanson | H03K 17/145 327/432 |
| 10,164,628 | B2 * | 12/2018 | Serizawa | H02J 7/0026 |
| 2010/0208401 | A1 * | 8/2010 | Kimoto | H02H 9/047 361/77 |

FOREIGN PATENT DOCUMENTS

| | | |
|---|---|---|
| JP | 2013-204451 A | 10/2013 |
| JP | 2014-116197 A | 6/2014 |

* cited by examiner

RELAY DRIVER CIRCUIT

CROSS-REFERENCE TO RELATED APPLICATIONS

This application is the U.S. national stage of PCT/JP2019/009236 filed on Mar. 8, 2019, which claims priority of Japanese Patent Application No. JP 2018-054225 filed on Mar. 22, 2018, the contents of which are incorporated herein.

TECHNICAL FIELD

The technology described herein relates to a relay driver circuit, specifically, the relay driver circuit capable of maintaining an operating state of a relay even when a drop occurs in power supply voltage.

BACKGROUND

A technology for maintaining an operating state of a relay even when a drop occurs in power supply voltage has been known. An example of such a technology is disclosed in Japanese Unexamined Patent Application Publication 2014-116197. In Japanese Unexamined Patent Application Publication 2014-116197, a first switch and a second switch are provided in two systems for driving a relay. A resistor is connected between the second switch and a coil of the relay. The relay is driven with the second switch to which the resistor is connected after a contact of the relay is moved. The relay is driven with the first switch if the drop occurs in power supply voltage to reduce power consumption and maintain the operating state of the relay even if the drop occurs in power supply voltage. Such a technology is disclosed.

As in Japanese Unexamined Patent Application Publication 2014-116197, semiconductor components are used for driving relays in recent years. A drop in power supply voltage, which may cause a drop in control input voltage applied to the semiconductor components, may have an adverse effect on control of relay operation.

In FIG. 2, two relays (RL1 and RL2) provided in two stages are connected to a relay driver circuit 10P. The relay RL2 in the second stage (the lower stage) may be a load connected to the relay RL1 in the first stage (the upper stage). In such a configuration, a diode D1 for protection of a semiconductor component Q1 may be provided in a control input line LCN connected to a semiconductor component for driving the lower stage relay RL2. If a load RD1 that is connected in parallel to the lower stage relay RL2 is an inductive load such as a motor, the diode D1 is provided in the control input line LCN for the protection of the semiconductor component Q1 from a surge caused by the inductive load. The control input voltage of the semiconductor component Q1 may drop due to a voltage drop Vf (a forward voltage) of the diode D1. The semiconductor component Q1 may not be able to remain in an on state, that is, the operating state of the lower stage relay RL2 may not be maintained if a drop in battery voltage Vb (a power supply voltage) is out of tolerance.

A technology described herein is to provide a relay driver circuit that is capable of maintaining an operating state of a lower stage relay when a power supply voltage is low in a configuration that includes a protective component provided in a control input line connected to a semiconductor component for driving the lower stage relay that is a load connected to an upper stage relay.

SUMMARY

A relay driver circuit described herein is connected between an upper stage relay and a lower stage relay that is configured to be driven in response to driving of the upper stage relay. The relay driver circuit is configured to drive the lower stage relay. The relay driver circuit includes a semiconductor component, a control input line, a protective component, and a buffer circuit. The semiconductor component switches on and off the lower stage relay. The control input line is electrically connected to a control terminal of the semiconductor component. A power supply voltage is applied to the control input line via the upper stage relay. The protective component is connected in the control input line to protect the semiconductor component. The buffer circuit is connected between the protective component in the control input line and the control terminal of the semiconductor component to compensate for a voltage drop due to the protective component.

According to the configuration, the voltage drop due to the protective component is compensated by the buffer circuit and thus a decrease in power supply voltage due to the protective component is reduced. Although the configuration for driving the lower stage relay, which is a load connected to the upper stage relay, includes the protective component provided in the control input line that is connected to the semiconductor component, an operating state of the lower stage relay is maintained even if the power supply voltage is low.

In the relay driver circuit, the buffer circuit may include a PNP bipolar transistor and an NPN bipolar transistor. The PNP bipolar transistor may include an emitter that is connected to a power supply line and a collector that is electrically connected to a control terminal of the semiconductor component. The NPN bipolar transistor may include a collector that is electrically connected to a base of the PNP bipolar transistor, a base that is electrically connected to an output of the protective component, and an emitter that is grounded. The protective component may include a protective diode that may include an anode that is connected to a contact of the upper stage relay and a cathode that is connected to the base of the NPN bipolar transistor.

According to the configuration, a voltage drop (a forward voltage) due to the diode can be properly compensated by the buffer circuit that includes two bipolar transistors. The forward voltage of the diode is about 0.7 V and a collector-emitter voltage of the PNP bipolar transistor is normally less than 0.7 V. When the power supply voltage is applied via the PNP bipolar transistor, the power supply voltage with a less voltage drop in comparison to a configuration in which the power supply voltage is applied via the diode can be applied to the control terminal of the semiconductor component. Namely, the voltage drop due to the diode is properly compensated.

In the relay driver circuit, the buffer circuit may include a rectifier diode that may include an anode that is electrically connected to the base of the PNP bipolar transistor and a cathode that is electrically connected to the collector of the NPN bipolar transistor.

According to the configuration, if the power supply is a battery, protection against inverse connection of the battery is provided.

Advantageous Effect of the Disclosure

According to the relay driver circuit described herein, although the configuration for driving the lower stage relay, which is a load connected to the upper stage relay, includes the protective component provided in the control input line that is connected to the driver semiconductor component, an operating state of the lower stage relay is maintained even if the power supply voltage is low.

DETAILED DESCRIPTION OF PREFERRED EMBODIMENTS

A relay driver circuit 10, which is an embodiment according to the present disclosure, will be described with reference to FIG. 1. The relay driver circuit 10 in this embodiment is installed in a vehicle and a power supply is a battery Ba that is an onboard battery. The relay driver circuit 10 and the power supply are not limited to those for a vehicle.

Circuit Configuration

Figure 1:
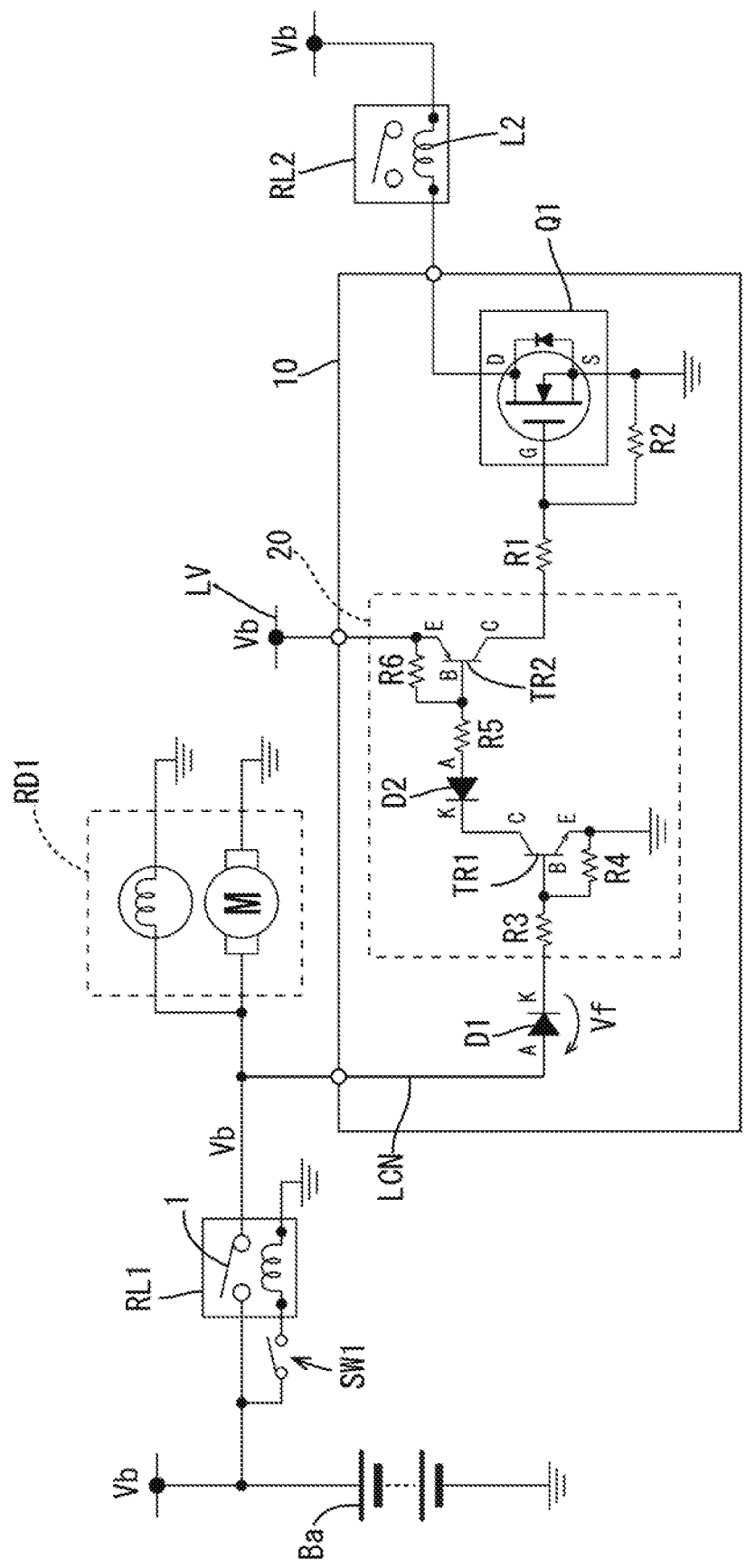
FIG. 1 is a schematic block diagram of a relay system including a relay driver circuit according to an embodiment of the present disclosure.

As illustrated in FIG. 1, the relay driver circuit 10 is connected between an upper stage relay RL1 and a lower stage relay RL2 that is driven in response to driving of the upper stage relay RL1. The relay driver circuit 10 is configured to drive the lower stage relay RL2. The lower stage relay RL2 is connected to the upper stage relay RL1 and in parallel to an inductive load RD1 including a motor M. The lower stage relay RL2 and the inductive load RD1 become active when the upper stage relay RL1 is actuated.

The relay driver circuit 10 includes a semiconductor component Q1, a control input line LCN, a protective diode D1, and a buffer circuit 20.

The semiconductor component Q1 may include an N-channel MOSFET as illustrated in FIG. 1. The semiconductor component Q1 is configured to switch on and off the lower stage relay RL2 in response to on and off of the upper stage relay RL1. Specifically, the semiconductor component Q1 is configured to start and stop a flow of an exciting current through an exciting coil L2 in the lower stage relay RL2. Bias resistors (R1, R2) are connected to a gate G of the semiconductor component Q1.

The control input line LCN is electrically connected to the gate G of the semiconductor component Q1. The gate G is a control terminal. When the upper stage relay RL1 is in the on state, a battery voltage Vb (a power supply voltage) is applied to the control input line LCN via a relay contact 1 of the upper stage relay RL1.

A protective diode D1 (an example of a protective component) is provided in the control input line LCN. The protective diode D1 protects the semiconductor component Q1 from a surge caused by the inductive load RD1, such as a motor that is connected to the upper stage relay RL1, transmitted through the control input line LCN. An anode A of the protective diode D1 is connected to the relay contact 1 of the upper stage relay RL1 via the control input line LCN. A cathode of the protective diode D1 is connected to a base B of an NPN bipolar transistor TR1, which will be described later, via a bias resistor R3.

The buffer circuit 20 is connected between the protective diode D1 in the control input line LCN and the gate G of the semiconductor component Q1 to compensate for the voltage drop Vf (the forward voltage) due to the protective diode D1.

Specifically, as illustrated in FIG. 1, the buffer circuit 20 includes the NPN bipolar transistor (hereinafter referred to as the NPN transistor) TR1, a PNP bipolar transistor (hereinafter referred to as the PNP transistor) TR2, a rectifier diode D2, and bias resistors (R3, R4, R5, and R6).

An emitter E of the NPN transistor TR1 is connected to a ground so that the emitter E is grounded. A collector C of the NPN transistor TR is connected to a cathode K of the rectifier diode D2. The collector C is electrically connected to a base B of the PNP transistor TR2 via the rectifier diode D2 and the bias resistor R5. The base B of the NPN transistor TR1 is electrically connected to the cathode K (an output of the protective component) of the protective diode D1 via the bias resistor R3.

The emitter E of the PNP transistor TR2 is connected to a power supply line LV. The collector C of the PNP transistor TR2 is electrically connected to the gate G of the semiconductor component Q1 via the bias resistor R1. The base B of the PNP transistor TR2 is connected to the anode A of the rectifier diode D2 via the bias resistor R5.

The anode A of the rectifier diode D2 is electrically connected to the base B of the PNP transistor TR2 via the bias resistor R5. The cathode K of the rectifier diode D2 is connected to the collector C of the NPN transistor. The rectifier diode D2 is a protection against inverse connection of the battery Ba. If the battery Ba is inversely connected, a current flows from the ground to the power supply line LV via the resistor R4, the base B to the collector C of the NPN transistor TR1, resistor R5, and the resistor R6 in this sequence if the rectifier diode D2 is not provided. Therefore, an inverse voltage is applied between the base B and the emitter E of the NPN transistor TR1 and the base B and the emitter E of the PNP transistor TR2. This may result in damages to the transistors.

Operation of the Buffer Circuit

Next, operation of the buffer circuit 20 having the above configuration will be described.

When the upper stage relay RL1 is switched on through actuation of an upper stage relay actuating switch SW1, the battery voltage Vb is applied to the buffer circuit 20 via the control input line LCN and the protective diode D1. A base current flows through the NPN transistor TR1 and the NPN transistor TR1 turns on. A base current flows through the PNP transistor TR2 and the PNP transistor TR2 turns on.

The battery voltage Vb is applied to the gate G of the semiconductor component Q1 via the PNP transistor TR2. The semiconductor component Q1 turns on and thus the lower stage relay RL2 is switched on.

Figure 2:
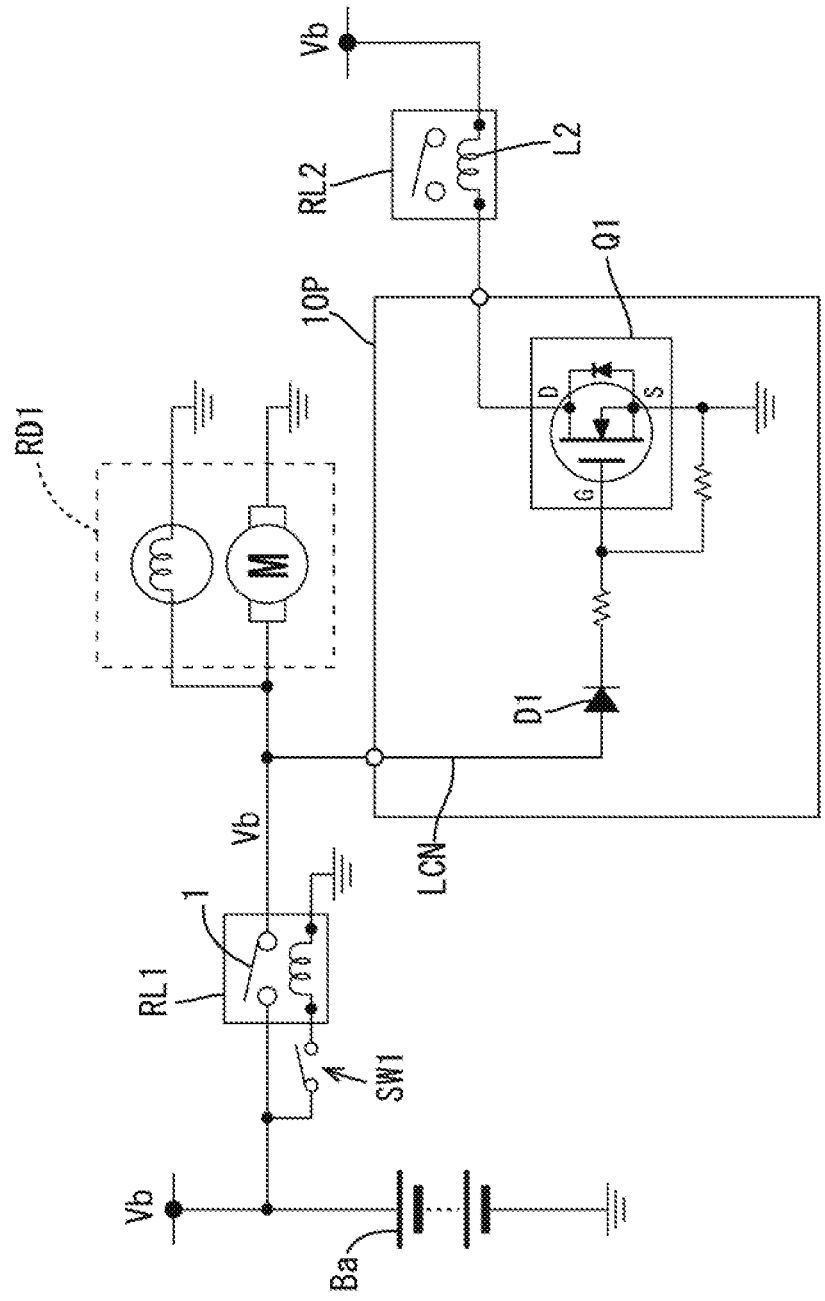
FIG. 2 is a schematic block diagram of a relay system including a known relay circuit.

Normally, a collector-emitter voltage drop in the PNP transistor TR2 is equal to or less than 0,1 V, which is sufficiently smaller than the voltage drop Vf due to the protective diode D1 (normally, 0.7 V). In comparison to the known example illustrated in FIG. 2, a voltage closer to the battery voltage Vb can be applied to the gate G of the semiconductor component Q1 (more precisely, bias resistors R1 and R2). In the configuration that includes the protective diode D1 in the control input line LCN, the on state of the semiconductor component Q1 is maintained and thus the on state of the lower stage relay RL2 is maintained even if the battery voltage Vb is further dropped in comparison to the known example.

Effects of the Embodiment

The voltage drop Vf due to the protective diode D1 is compensated by the buffer circuit 20. Namely, with the buffer circuit 20, a decrease in battery voltage Vb due to the protective diode D1 can be reduced. Although the configuration for driving the lower stage relay RL2, which is the load connected to the upper stage relay RL1, includes the protective diode D1 that is connected in the control input line LCN that is connected to the semiconductor component Q1 (the driver semiconductor component), the operating state of the lower stage relay RL2 is maintained even if the battery voltage Vb is lower in comparison to the configuration that does not include the buffer circuit 20. This improves functionality and safety of a vehicle system.

The buffer circuit 20 properly compensates for the voltage drop Vf (the forward voltage) due to the protective diode D1 with two bipolar transistors (TR1 and TR2), that is, with a simple configuration. Normally, the forward voltage of a diode is about 0.7 V and thus a voltage drop due to an on-resistance of the PNP bipolar transistor TR2 is equal to or less than 0.1 V. When applying the battery voltage Vb to the gate terminal G (the control terminal) of the semiconductor component Q1 via the PNP bipolar transistor TR2, the battery voltage Vb with less voltage drop can be applied to the gate terminal G in comparison to a configuration in which the battery voltage Vb is applied via the protective diode D1. The voltage drop Vf due to the protective diode D1 is properly compensated and reduced.

The present disclosure described herein is not limited to the embodiment described above and illustrated in the drawing. For example, the following embodiments will be included in the technical scope of the technology described herein.

Figure 3:
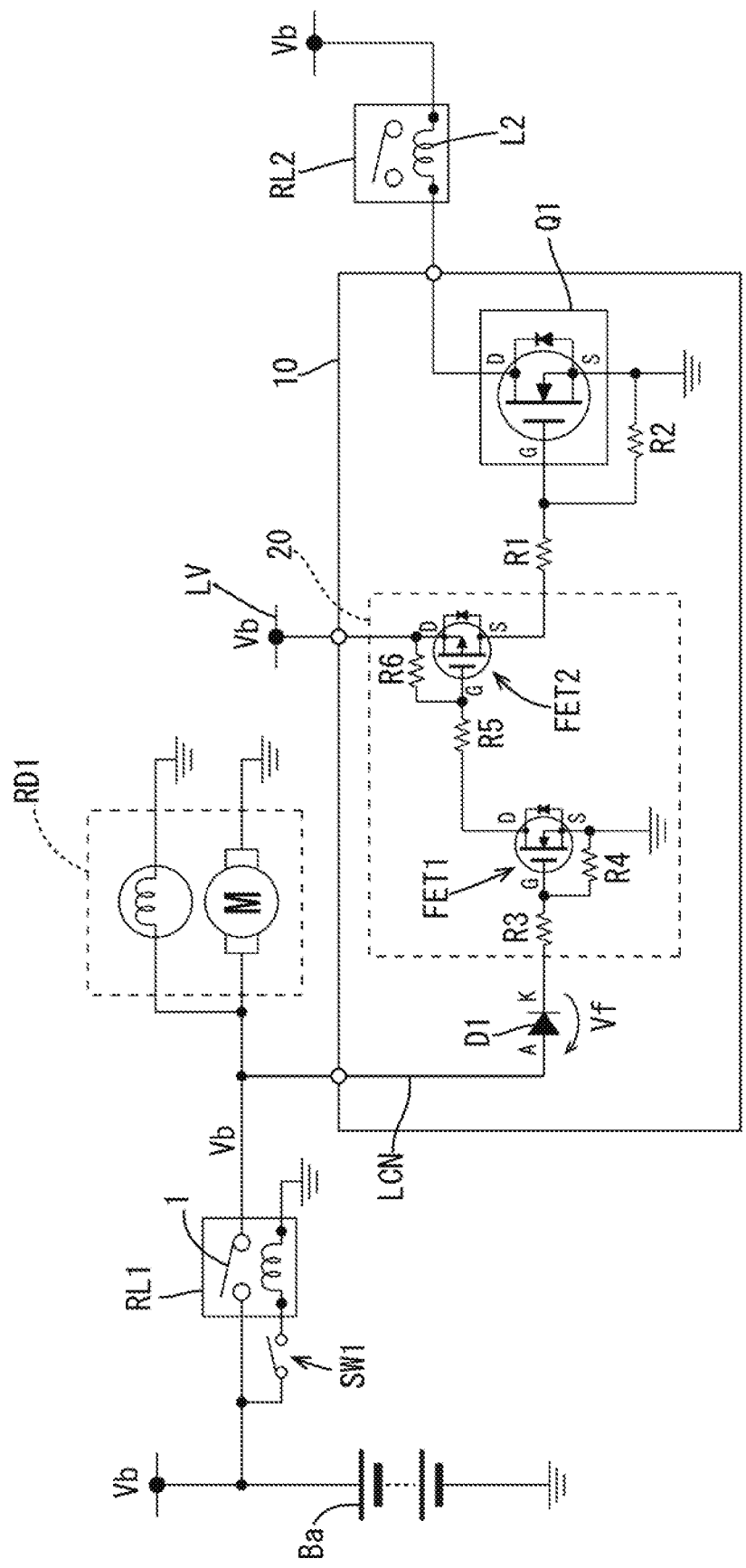
FIG. 3 is a schematic block diagram of a relay system including another example of a relay driver circuit.

In the above embodiment, the buffer circuit 20 includes two bipolar transistors (TR1 and TR2). However, the configuration of the buffer circuit 20 is not limited to such a configuration. For example, as illustrated in FIG. 3, the NPN transistor TR1 and the PNP transistor TR2 of the buffer circuit 20 may be replaced with an N-channel MOSFET 1 and a P-channel MOSFET 2, respectively.

In the above embodiment, the protective diode D1 is provided as an example of the protective component. However, the protective component is not limited to the protective diode D1. For example, if the surge caused by the inductive load RD1 is significantly small, a resistor having a low resistance may be used for the protective component.

In the above embodiment, the rectifier diode D2 is included in the buffer circuit 20 for the protection against inverse connection of the battery. However, the rectifier diode D2 may be omitted.

The invention claimed is:

1. A relay driver circuit connected between an upper stage relay and a lower stage relay configured to be driven in response to driving of the upper relay, the relay driver circuit comprising:
   a semiconductor component configured to switch on and off the lower stage relay;
   a control input line electrically connected to a control terminal of the semiconductor component and to which a power supply voltage is applied via the upper stage relay;
   a protective component connected in the control input line to protect the semiconductor component; and
   a buffer circuit connected between the protective component in the control input line and the control terminal of the semiconductor component to compensate for a voltage drop due to the protective component, wherein
   the buffer circuit includes a PNP bipolar transistor and an NPN bipolar transistor,
   the PNP bipolar transistor includes an emitter connected to a power supply line and a collector electrically connected to the control terminal of the semiconductor component,
   the NPN bipolar transistor includes a collector electrically connected to a base of the PNP bipolar transistor, a base electrically connected to an output of the protective component, and an emitter grounded, and
   the protective component includes a protective diode including an anode connected to a contact of the upper stage relay and a cathode connected to the base of the NPN bipolar transistor.

2. The relay driver circuit according to claim 2claim 1, wherein the buffer circuit further includes a rectifier diode including an anode electrically connected to the base of the PNP bipolar transistor and a cathode electrically connected to the collector of the NPN bipolar transistor.

3. A relay driver circuit connected to an upper stage relay connected to a power supply and to a lower stage relay configured to be driven in response to driving of the upper stage relay, the relay driver circuit comprising: a semiconductor component connected to the lower stage relay and configured to switch on and off the lower stage relay; a control input line connected to the upper stage relay and to which a power supply voltage is applied via the upper stage relay; a protective component connected between the control input line and a control terminal of the semiconductor component to protect the semiconductor component; and a buffer circuit connected between the protective component and the control terminal of the semiconductor component to compensate for a voltage drop due to the protective component, wherein the buffer circuit includes a PNP bipolar transistor and an NPN bipolar transistor, the PNP bipolar transistor includes an emitter connected to a power supply line and a collector electrically connected to the control terminal of the semiconductor component, the NPN bipolar transistor includes a collector electrically connected to a base of the PNP bipolar transistor, a base electically connected tp an output of the protective component, and an emitter grounded, and the protective component includes a protective diode including an anode connected to a contact of the upper stafe relay and a cathode connected to the base of the NPN bipolar transistor.

4. The relay driver circuit according to claim 3, wherein the buffer circuit includes an input terminal connected to the protective component and an output terminal connected to the control terminal of the semiconductor component.

5. The relay driver circuit according to claim 3, wherein the buffer circuit further includes a rectifier diode including an anode electrically connected to the base of the FNP bipolar transistor and a cathode electrically connected to the collector of the NPN bipolar transistor.

* * * * *